United States Patent Office 2,945,166
Patented July 12, 1960

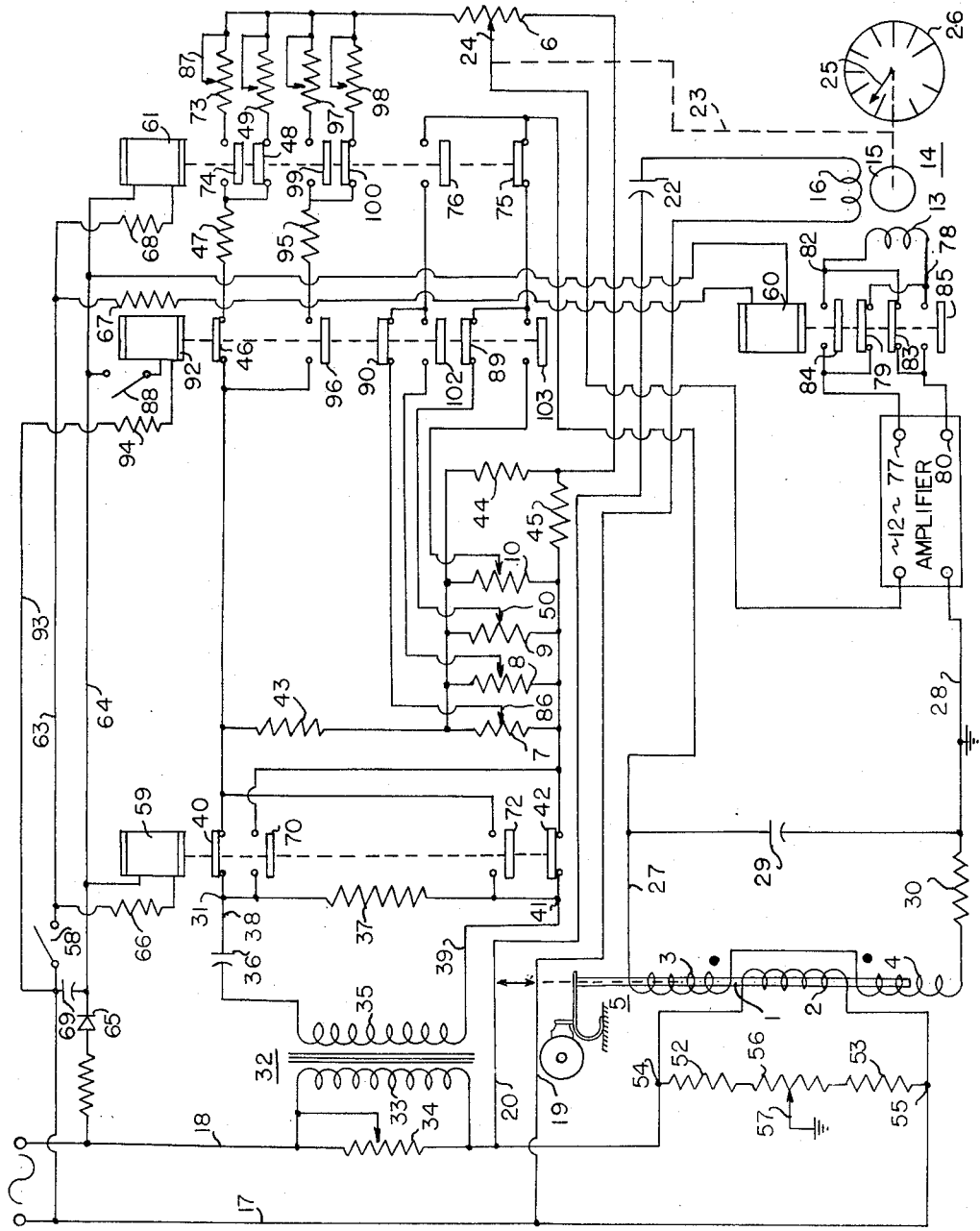

2,945,166
SERVOMOTOR CONTROL CIRCUIT

Robert E. Bell and Charles F. Spademan, Toledo, Ohio, assignors, by mesne assignments, to Toledo Scale Corporation, Toledo, Ohio, a corporation of Ohio Filed June 5, 1957, Ser. No. 663,730

8 Claims. (Cl. 318—28)

This invention relates to electrical control circuits for condition responsive applications such as load weighing.

Heretofore condition responsive circuits have been proposed wherein an electrical translator generates a signal which is a function of the condition to be sensed and that signal is opposed by a signal from a second signal translator which is adjustable. The two signals have been balanced by adjustment of the second translator manually or automatically by a servomechanism actuated by the difference between the signals. The usual practice has been to employ like forms of translators, a resistive strain gage and a potentiometer or a master and slave differential transformer for example, in order to provide convenient means for accurately following the displacement of the master translator by the slave translator. Many applications of these devices to load weighing have involved imposing loads upon the translators through a lever system interconnecting the load receiver and the translator. In such systems the range of displacement of the sensing element can be adjusted to suit the needs of the translator and the range of loads to be encountered. However, there are certain drawbacks to such constructions which dictate a more simplified direct measurement of displacement by load. Often this direct measurement is limited to a few thousandths of an inch of load receiver displacement. When so limited, it is extremely difficult to provide apparatus which is actuated by a slave translator having the same signal vs. displacement characteristic as the master translator and to utilize that slave translator motion effectively. This problem becomes particularly difficult to solve where the system is employed for load measurement and the load signal is matched by a motion of the slave translator of but a few thousandths of an inch. When the slave is coupled to an indicator such slight motion is insufficient to accurately indicate weight with economically practical drives and mechanical couplings. Thus, an indicator which is required to be accurate to 0.1% of full scale when driven in conjunction with a slave translator having a full range of travel of 0.030 inch must follow shifts in position of the translator to an accuracy of 0.00003 inch. Such accuracy of the servomechanism and the mechanical indicator linkage is impractical economically.

In accordance with the above, one object of this invention is to effect an accurate mechanical amplification in an electrical control circuit having master and slave electromechanical translators.

Another object is to facilitate the utilization of electromechanical transducers having a limited stroke length for their movable elements.

A third object is to enable a limited stroke electromechanical transducer to produce signals characteristic of small increments of load over a wide range of load capacity and to accurately indicate those small load increments.

A fourth object is to provide an up scale reading on an indicator driven with a slave electromechanical transducer where the master electromechanical transducer is subject to bidirectional loading and/or to several ranges of loading.

A fifth object is to reduce the effects of stray reactance in an inductive type of electromechanical transducer.

A further object is to integrate in a load measuring system a limited travel inductive type electromechanical transducer with a servomechanism actuated resistive type electromechanical tranducer having a relatively large range of travel.

These objects are realized in the illustrative system for a dynamometer of the type shown in the copending application for "Load Measuring Device," Serial No. 596,634, filed July 9, 1956, for Charles F. Spademan and Kenneth F. Wetzel. In this system a differential transformer is employed as the master electromechanical transducer to measure the deflection of the arms of a C spring arranged to oppose rotation of the frame of an electrical dynamometer. Since the length of the stroke of the transformer core from zero to maximum load is limited to such an extent as to be impractical for following by an indicator and since a remote indication is required, the signal generated by the transformer is balanced by a relatively long stroke potentiometer to which is coupled a mechanical indicator such as a pointer sweeping over an arcuate dial. An amplifier derives an input signal representative of the net transformer-potentiometer signal and delivers an amplified signal which is a function of that net signal to a control winding of a servomotor. The servomotor is coupled to the adjustable contactor of the potentiometer and the associated indicator so that the contactor is positioned to cause the issuance from the potentiometer of a signal balancing the transformer signal and the indicator is set to indicate the load imposed on the transformer.

Since several of the elements of the circuit introduce phase shifts, quadrature signal components, which produce errors in the load indication, the circuit is arranged to eliminate the adverse effects of these shifts. Quadrature components are eliminated by shifting the signals from the master translator, the transformer, and the slave translator, the potentiometer, to an in phase relationship which is sufficiently shifted from the driving or energizing signal that the phase shift introduced by amplifying the net signal of the translators produces an amplified signal which is in phase with the driving signal. Thus, the entire signal is effective in controlling the servomechanism.

The sensitivity of the system to phase shifts and the presence of capacitance having a high temperature coefficient in the circuits of the differential transformer give rise to substantial variations in the response with temperature changes and thus to inaccuracies in the system. These variations are overcome by balancing the voltage applied to the terminals of the transformer primary to ground, as through a potentiometer connected across those terminals and having its contactor grounded.

The system is also arranged to read up scale from zero in but one direction when the master translator has its movable element displaced from the zero position in either direction. This is accomplished by reversing the excitation of the slave translator when the direction of loading is reversed. In order to maintain stability in the servomechanism, the signal feed from the amplifier to the servomechanism control is reversed in conjunction with the reversal of slave excitation.

A feature of this invention involves balancing the terminals of a differential transformer primary with respect to ground.

Another feature resides in reversing the excitation of a slave electromechanical translator when the loading of a master electromechanical translator with which it is associated is reversed.

A further feature concerns reversing the control signals applied to a servomechanism arranged to effect a signal balance between a master and slave signal translator when the master is driven from zero in a reverse direction.

Another feature comprises establishing fixed phase relationships between the several signals in a condition responsive system which is adapted for reversals in operation whereby the relationships, particularly those involving feed-back, are maintained stable throughout the various operating modes and conditions encountered without alteration of the means establishing the phase relationships.

The above and additional objects and features of this invention will be appreciated more fully from the following detailed description when read with reference to the drawing showing an illustrative control circuit for a load measuring system embodying the invention.

In the drawing a system is shown wherein displacement of differential transformer core 1 alters the coupling between primary 2 and individual secondaries 3 and 4. Bi-directional loading of a measuring system according to the aforenoted application of C. F. Spademan and K. F. Wetzel is schematically represented in the drawing to illustrate one form of mechanism for displacing transformer core 1. In accordance with the teachings of that application a dynamometer is the loading element and has its stator biased toward a neutral position by a C spring one leg of which is directly coupled to the stator and the other leg of which is coupled to a fixed point of reference such that the loading of the dynamometer tends to carry the legs of the C toward or away from each other. The leg of the C coupled to the dynamometer stator has an extension coupled to core 1 so that motion in the core is a function of the dynamometer load. Secondaries 3 and 4 are connected in opposition and are conveniently of as nearly identical characteristics both electrically and mechanically as is practicable. Thus, displacement of core 1 from a position equally coupling primary 2 to secondaries 3 and 4 to a second position, axially of the windings in the illustrative structure, wherein one secondary is more closely coupled to the primary than the second results in a net signal from the transformer. This signal is a function of the displacement and if the transformer is symmetrical it is equal in magnitude for equal core displacements in either direction from the zero or balance position although one signal is in phase opposition to its counterpart.

The signal issuing from the inductive type electromechanical translator 5, the differential transformer, is matched by a composite signal from indicator potentiometer 6 and a zero adjustment potentiometer 7, 8, 9 or 10. The resulting net signal is fed to amplifier 12. From the amplifier 12 the signal resulting from the net signal of the translators 5, 6 and one of 7, 8, 9 or 10, which can be identified as the error signal, is applied to the control winding 13 of a servomotor 14 having an armature 15 which is rotated as in a two phase motor when the signal on winding 13 is appropriately shifted in phase with respect to the signal on a reference winding 16.

Alternative forms of signal translators can be substituted for those illustrated although those proposed are considered optimum for the application from the standpoint of economy, stability and accuracy. Other forms of inductive type electro-mechanical translators such as E magnets, inductive bridges, variometers, and variable coupled transformers can be substituted for the linear differential transformer. In some applications other forms of electromechanical translators can be substituted for the inductive type translator. Further the resistive type translators, potentiometers, can be replaced with inductive or other type translators if phase compensation for these elements is added.

A source of alternating current feeds leads 17 and 18 supplying the several subcircuits of the combination.

Branch leads 19 and 20 extend from leads 17 and 18 to reference winding 16 through phase shifting capacitor 22 to energize winding 16 with current in quadrature with the driving or source signal. Thus when the error signal results from a net signal characteristic of a master translator signal greater than the slave translator signal, its phase is so related to the reference signal that armature 15 tends to turn in a manner which readjusts the slave translator, potentiometer 6, to issue a signal matching that of the master transformer 5. This adjustment is effected by a mechanical linkage, for example a belt and pulley drive schematically represented by dashed line 23, coupling armature 15 to contact arm 24 of potentiometer 6. Indicator arm 25 is also driven by drive 23 to a position opposite an indicium on a weight chart 26 corresponding to the load which caused the displacement of core 1.

A quadrature rejection means is provided in the amplifier 12 in order to restrict the effective net signal to those components which will produce an error signal effective in driving the servomotor 14 to a null producing position. This means is described in detail in Patent No. 2,712,082 entitled "Electrical Control Circuit" which issued June 28, 1955, to Maynard C. Yeasting. It comprises an amplifier which introduces a phase shift in its output signal, the error signal, with respect to its input signal, and a net signal sampler which is driven at sixty cycles per second to sample the net signal momentarily during each half cycle. If, as assumed, the signal in the reference winding 16 is in quadrature with the master or driving signal applied to leads 17 and 18, then it is desirable to develop an error signal in control winding 13 in phase with the driving signal and thus in quadrature with the signal on reference winding 16.

Signal sampling in the input stages of the amplifier under consideration lags the line voltage and produces a pulsating signal which is lagging the line voltage. For example, if the sampling lags the line voltage by 20°, the resulting signal will lag the line by 20°. Accordingly, an amplifier is employed to introduce a compensating lead where it is desirable to restore the signal resulting from the sampling to an in phase relationship, e.g. a 20° lead. Sampling is most effective if accomplished at the maximum in current of the desired signal and thus the minimum for the signal in quadrature therewith. Thus, the maximum in the current of the net signal should be adjusted to coincide with the sampling instant and the net signal should lead the line voltage by the quadrature complement of the sampling lag e.g. 90°−20° or 70° leading the line.

Since the net signal is made up of a combination of the signal from the differential transformer secondaries, the signal from the indicator potentiometer, and the the signal from a zero adjustment potentiometer (to be discussed below) and to be effective these signals should all be in phase (either aiding or opposing) and leading the sampling instant by 90°, phase adjustments must be effected for each signal and should be maintained throughout operation of the system. Phase adjustment of the differential transformer output requires consideration of the shift from line voltage introduced by the transformer. This shift due to the mutual inductance results in a signal leading the line by 85° in the examplary embodiment. Since the shifted signal must be shifted further to a 70° lead with respect to the line at conductors 27 and 28, a lag network is connected across those conductors. This network comprises the capacitor 29 connected across conductors 27 and 28 and a series resistor 30. The values of the capacitor 29 and resistor 30 can be chosen to introduce a 15° lag whereby the leading signal from the secondaries is reduced to an appropriate phase for feeding to the amplifier, e.g. 85°−15°=70° lead.

Potentiometers 6 through 10 are also excited with the desired phase relationship by means of a circuit fed from a closely coupled isolation transformer 32 which introduces essentially no phase shift. The primary 33 of transformer 32 is excited by a current flowing in resistor 34 in series with the primary 2 of differential transformer 5 and, therefore, it must be in phase with the flux producing current in the primary 2 of differential transformer 5. Thus, the secondary winding 35 delivers a current essentially in phase with the voltage on leads 17 and 18 to the phase shifting network consisting of series condenser 36 and shunting resistor 37 connected across the main leads 38 and 39 of the exciting circuit. The condenser 36 and resistor 37 are proportioned with respect to the remaining elements of the circuit to effect a phase shift at junctions 31 and 41 corresponding to that on conductors 27 and 28, e.g. 70° leading. The resistance across junctions 31 and 41 in the remainder of the circuit is so great as to have negligible effect on the phase. From the phase shifting portions of the network, the excitation currents are fed through relay contacts 40 and 42 to a voltage divider consisting of fixed resistors 43, 44 and 45 which develops voltage and current in the usable range across zero adjustment potentiometers 7, 8, 9 and 10 and across potentiometer 6. The connections through the relay contacts are such as to excite the indicator potentiometer to issue a signal to the network including the amplifier and secondaries 3 and 4 which opposes the signal from those secondaries and the zero adjustment potentiometer signals to that network can be of the same or opposite polarites depending upon the circuit requirements.

Indicator potentiometer 6 is excited by the portion of the signal across the voltage divider resistors through contacts 46, resistor 47 of the span adjustment circuit, contacts 48 and rheostat 49 of the span adjustment circuit. Resistor 47 and rheostat 49 in combination fix the voltage across potentiometer 6 by virtue of the adjustment of the rheostat so that the signal from potentiometer 6 developed between the zero position of contact arm 24 on the resistance element of potentiometer 6 and the full scale position is equal to that developed in the transformer 5 for a full load as indicated on the dial 26.

Zero position of the potentiometer 6 and the limit for defining the span of the potentiometer is determined by zero adjustment potentiometer 9 when the circuit is in the condition shown by the proper positioning of its contact arm 50 when core 1 is at its zero or no load position. Contact arm 50 is adjusted with reference to the position of indicator arm 25 to a position where the servomotor positions arm 25 on the zero indicium and thus establishes the zero position for arm 24 on potentiometer 6.

When span adjust rheostat 49 and zero adjust potentiometer 9 have been adjusted properly, the removal of all loading on the system mechanically coupled to transformer 5 results in a signal balance and thus a quiescent state in the servo loop at the zero position of contact arm 24 and indicator arm 25.

Imposition of a load on the load receiver causes relative displacement of core 1 and windings 2, 3, and 4 of transformer 5 as a function of that load and thus produces a net signal on leads 27 and 28 which is a function of that load. That signal exceeds the signals from potentiometers 6 and 9 and is fed as a net signal to amplifier 12. Amplifier 12 passes an error signal to control winding 13 to cause armature 15 to rotate and drive potentiometer arm 24 in a direction to impose a greater portion of the signal developed across that potentiometer in the network feeding the amplifier. Since that signal opposes the transformer signal, the net signal to the amplifier is reduced as is the error signal. Thus, when the signal from potentiometer 6 has been adjusted to create a null in the net signal to the amplifier, the system again becomes quiescent. In this state, the indicator arm 25 points to the indicium on scale 26 corresponding to the applied load and the potentiometer issues a signal greater than its zero signal by an amount equal and opposite to the signal emanating from the transformer 5 due to the relative displacement of the core and windings from their no load relationship.

A high degree of accuracy can be realized in the potentiometer 6, the indicator and the servomotor by employing a wide range of stroke. However, the master translator or condition sensing element is restricted in its range of stroke by considerations inherent in the system in which it is utilized. Thus, a dynamometer whose motion is confined by the linear range of deflection vs. loading in a C spring, as contemplated in the example, is limited to a full stroke range of travel from no load to full load of the order of hundredths of an inch, e.g. 0.030 inch. In such a restricted range a highly sensitive circuit is required. Such sensitivity coupled with the need to maintain phase relationships with a reasonable degree of precision renders the proposed circuit vulnerable to the effects of stray capacitance. A closely coupled inductive device of the type represented by transformer 5 exhibits substantial interwinding capacitance, particularly between the primary and secondaries. Additional stray capacitance to ground may be present in this translator or other inductive types which might be employed in its stead. The sensitivity of this circuit to such capacitance is further enhanced where, as in the present application, the secondaries are held relatively close to ground as by grounded lead 28. Further, while it is feasible to compensate for a single value of stray capacitance, this factor has a high temperature coefficient in the range of operating temperatures and therefore the equipment required for compensation over this range becomes excessive.

Another source of signal variations apart from those to be sensed is believed to arise from differences in the voltage to ground at the input terminals of the primary 2. These differences may arise in the rheostat 34 and transformer 32 connected to lead 18 as by the stray capacitance to ground in that transformer and the circuits connected thereto.

These stray effects associated with the differential transformer have been substantially eliminated by balancing the ends of primary 2 to ground. This has been effected by connecting fixed resistors 52 and 53 of like magnitude to junction points or primary terminals 54 and 55 and by connecting between the resistors a potentiometer 56 having its adjustable contact 57 grounded. Experience has indicated that optimum results are attained in this circuit by adjusting it so that approximately equal voltages are developed between junctions 54 and 55 and ground although in some instances a slight deviation from this relationship provides the greatest stability and the lowest noise in the circuit. For purposes of defining the adjustment, the term "balanced to ground" as employed herein is intended to embrace that range of adjustments wherein the ends of the primary are tied to ground through suitable resistance and the effect of phase drift in the translator 5 is reduced.

The illustrated circuit is arranged for loads displacing the core 1 downward or upward with respect to windings 2, 3 and 4 in differential transformer 5. This feature is particularly advantageous in load measuring circuits for dynamometers wherein the dynamometer is employed to supply measured amounts of energy to drive a load, as where the frictional load within an engine is to be measured, or is employed to absorb energy, as when driven by the engine. In these instances the deflection of the load measurer in opposite directions from the zero position produces a signal of a first phase for one direction of loading, for example as described above when the dynamometer is absorbing load and core 1 is moved downward with respect to the windings, and produces a signal of a second phase 180° displaced from the first when the dynamometer is motoring and core 1 is moved upward with respect to the windings from zero with load.

The described condition illustrated the signals of the zero potentiometer and the indicator potentiometer arranged to cancel absorbing load signals. However, the phase reversal in the motoring load signal cannot be so balanced without altering the circuit. In both modes of operation the signal of the indicator potentiometer opposes the signal of the load responsive transformer in the network feeding the amplifier 12 for the servomotor control. Reversal of the phase of the transformer signal might be overcome by reversal of transformer excitation however, it was found that such reversal of excitation altered the noise level in the system, presumably due to the additional circuit components in the circuit feeding the differential transformer primary. Accordingly, the circuit is altered to reestablish the required signal opposition without altering the circuits of the differential transformer and without upsetting the critical phase relationships described above by inverting the phase of the signals from the zero and indicator potentiometers, substitution of zero and span potentiometers which have been adjusted as described for the motoring condition, and reversal of the phase of the error signal fed to control winding 13 of the servomotor. All of these functions are effected by closing switch 58 thereby energizing relays 59, 60 and 61 connected in parallel across branch leads 63 and 64 from leads 17 and 18. Unidirectional current is fed through rectifier 65 and current limiting resistors 66, 67 and 68 for the respective relays to each of their actuating coils upon closure of switch 58. To return the circuit to the power absorbing condition switch 58 is opened, condenser 69 serving to absorb surges and prevent arcing during such switching operations.

Relay 59, when energized, opens contacts 40 and 42 to interrupt the excitation path for the potentiometers previously outlined and closes contacts 70 and 72 to reverse the excitation paths. Thus, a 180° shift in phase is effected as regards the excitation of the potentiometers without altering the phase shifting network in the excitation circuit. This places the indicator potentiometer 6 in condition to oppose the signal of secondaries 3 and 4 as it appears on leads 27 and 28.

Energization of relay 61 disconnects absorbing load, span adjust rheostat 49 by opening contacts 48 and substitutes motoring load, span adjust rheostat 73 through the closure of contacts 74. It also disconnects absorbing load, zero adjust potentiometer 9 by opening contacts 75 to lead 27 and connects motoring load, zero adjusts potentiometer 7 to lead 27 through the closure of contacts 76.

The interchange of phase relationships between the signal for the sensed load and the matching signal requires reversal of the phase of the error signal so that the inverted phase in the net signal continues to drive the servomotor in the correcting direction. When relay 60 is energized, this inversion in phase is effected in a circuit corresponding to that subject to relay 59. Thus, terminal 77 of amplifier 12 connected to junction 78 through contacts 79 and terminal 80 connected to junction 82 through contacts 83 for absorbing power are interchanged through the opening of contacts 79 and 83 and the closing of contacts 84 and 85.

When the system is connected for reverse loading as where a dynamometer is functioning as a motor, the upward displacement of core 1 in the windings 2, 3, and 4 from the zero position is a function of load. Such displacement causes the current in secondary 3 to predominate, hence the phase of current issuing from the transformer as a function of load is shifted 180° from that for forward loading. Ideally, only one zero adjustment potentiometer is required if the differential transformer is absolutely symmetrical, no hysteresis is present in the mechanical drive for producing relative motion between the core 1 and the windings 2, 3 and 4, and the mechanical adjustment of the core to provide equal coupling to the secondaries is precise. However, such precision is not practical economically. Since the mechanical centering of the core with respect to the windings may not be established exactly, a new zero signal is inserted to electrically adjust that zero. This signal is derived from potentiometer 7 by adjustment of the position of its contact arm 86 so that the signals from potentiometers 6 and 7 balance the signal on leads 27 and 28 when the servomotor has driven the indicator arm 25 into registry with the zero indicium on chart 26 and similarly positioned contact arm 24 on the indicator potentiometer 6. Span is adjusted by proper adjustment of contact 87 in rheostat 73 to define the reverse load limits on the potentiometer 6 and chart 26 in a manner such that indicator arm 25 at full reverse load is in registry with the full load indicium on chart 25.

The scope of utilization of the illustrated system is enlarged further by the provision of a range selection for both forward and reverse loading. Such selection, illustrated as a high and low range, is effected by the operation of switch 88. While switch 88 is open, the system is set for low range operation with fixed span resistor 47 connected in circuit through normally closed relay contacts 46 and low range, forward load, zero adjust potentiometer 9 connected through normally closed relay contacts 89 and contacts 75 or low range, reverse load, zero adjust potentiometer 7 connected through normally closed relay contacts 90 and contacts 76 of relay 61. Closure of switch 88 energizes relay 92 from lead 93 through limiting resistor 94, the relay coil and lead 64. This relay introduces a new fix value span resistor 95 which establishes generally the high range span by opening contact 46 and closing contacts 96. Span adjust rheostats 97 and 98 are thus introduced to provide fine adjustment of the span, rheostat 97 functioning for reverse, high range operation when relay 61 is energized to close contacts 99 and rheostat 98 functioning for forward, high range operation when relay 61 is deenergized and contacts 100 are closed.

Change in range also is facilitated by a new zero adjustment which is conveniently established on separate potentiometers, potentiometer 10 for forward load, high range and potentiometer 8 for reverse load, high range. These potentiometers are substituted for the low range potentiometers 7 and 9 by the energization of relay 92 to open contacts 89 and 90 and close contacts 102 and 103.

While the above described features are embodied in a system particularly adapted for a specific application, namely a dynamometer, it is to be understood that these features have general application in the field of electrically controlled condition sensing systems. Thus, a means which can be loaded in either a forward or reverse direction and having a high and low range in each direction, means matching the signal of an inductive type electromechanical translator against a resistive type electromechanical translator and maintaining the required phase relationships by tying the primary of the inductive translator to ground, and means wherein a predetermined phase relationship is maintained upon the selective switching of directions for the condition to be sensed and the range of sensing can be applied jointly or severally to systems other than that illustrated without departing from the spirit and scope of this invention.

What is claimed is:

1. A load measuring system comprising an inductive type translator having a pair of input and a pair of output terminals, a signal source connected to said input terminals, means altering the coupling of the source signal to the output terminals as a function of the load applied, means to apply the load in a forward and a reverse direction, the phase of the signal from the output terminals for a reverse load being the opposite of that of signals for a forward load, a resistive means balancing said input terminals to ground, an adjustable translator, a network fed by the output signal from said inductive type translator and the output of said adjustable translator, a zero adjustment translator for issuing a signal to said network, an excitation circuit for said adjustable and said zero adjustment translators, means to establish a signal in said excitation circuit in phase with said signal from said output terminals, and means to connect said excitation circuit signal to said adjustable and zero adjustment translators to place the signals issuing from said translators in phase opposition to said signal from said output terminals.

2. A load measuring system comprising a signal source, a primary winding connected to said source, a pair of secondary windings inductively coupled to said primary and connected in phase opposition, a magnetic core movable with respect to said windings to alter the inductive coupling between said primary and respective secondary windings, means balancing the ends of the primary winding to ground, means displacing said core with respect to said windings from a no load position as a function of applied load selectively in a forward or a reverse direction, a potentiometer, an excitation circuit for said potentiometer developing an output signal therein in phase with the signal from said opposed secondaries, a network for combining into a net signal the signal from said secondaries and from the potentiometer, a translator issuing a signal to said network to establish a predetermined relationship of signals from said potentiometer and said secondaries under predetermined conditions, an excitation circuit for said translator developing an output signal therein in phase with the signal from said opposed secondaries, a servomotor coupled to said potentiometer to adjust its output signal, a control circuit for said servomotor responsive to said network signal, and means selectively to invert the phase of the signals exciting said potentiometer and said translator and the signal in said control circuit.

3. A load measuring system comprising an inductive type translator having a pair of input and a pair of output terminals, a signal source connected to said input terminals, means altering the coupling of the source signal to the output terminals as a function of the load applied, means to apply the load in a forward, and a reverse direction, the phase of the signal from the output terminals for a reverse load being the opposite of that of signals for a forward load, a resistive means balancing said input terminals to ground, an adjustable translator, a network fed by the output signal from said inductive type translator and said adjustable translator, a pair of translators each issuing a signal to said network to establish a predetermined relationship between said output signals under predetermined conditions, an excitation circuit supplying a signal for said adjustable and said pair of translators which is in phase with the signal from said output terminals, and means selectively to connect said excitation circuit to said adjustable translator and one of said pair of translators with a predetermined phase relationship to the signal from said output.

4. A condition sensing system comprising an inductive type electromechanical translator, a primary winding for said translator, a secondary winding for said translator, means responsive to the magnitude of the condition to be sensed to alter the inductive coupling between said primary and secondary as a function of said magnitude, said secondary issuing a first signal of a first phase in response to the imposition of a condition of one state and a second signal of a phase opposite to that of the first signal; in response to the imposition of a condition of a second state, means to balance the ends of said primary winding to ground to stabilize the signal phase relationships, a second electromechanical translator, an excitation circuit for said second translator, means to establish a signal in said excitation circuit which is in phase with said first and second signals, means to adjust the output signal issuing from said second translator, a servomotor mechanically driving said adjusting means, a servomotor control, a network for combining into a net signal the signal from the secondary of said inductive type translator and the output signal from said second translator and for applying said net signal to said servomotor control, and means selectively to invert the phase of the signal from said excitation circuit to said second translator to oppose the first or second signal issuing from said secondary and simultaneously to invert the phase of the effective net signal on said servomotor control.

5. A load measuring system comprising an inductive type translator having a pair of input and pair of output terminals, a signal source connected to said input terminals, means altering the coupling of the source signal to the output terminals as a function of the load applied, means to apply the load in a forward and a reverse direction, the phase of the signal from the output terminals for a reverse load being the opposite of that of signals for a forward load, a resistive means balancing said input terminals to ground to suppress phase drift, a second translator, an excitation circuit for said second translator developing an output signal component in phase with the signal from said inductive type translator, a network for combining the output signals of said translators, and switching means for selectively reversing the connection of the excitation signal to said second translator whereby said in phase signal component of the output can be placed in opposition with the output signal of said inductive type translator in said network for both forward and reverse loads.

6. A load measuring system comprising a signal source, a primary winding connected to said source, a pair of secondary windings connected in phase opposition, a magnetic core movable with respect to said windings to alter the inductive coupling between said primary and respective secondary windings, means balancing the ends of the primary winding to ground, means displacing said core from a no load position with respect to said windings as a function of applied load selectively in a forward or a reverse direction to develop a first signal of a given phase for forward displacement and a second signal of a phase opposite said given phase for reverse displacement, a potentiometer, an excitation circuit for said potentiometer developing an output signal therein in phase with the signal from said opposed secondaries, a network for combining into a net signal the signal from said secondaries and from the potentiometer, a servomotor coupled to said potentiometer to adjust its output signal, a control circuit for said servomotor responsive to said network signal, and means selectively to reverse the potentiometer excitation and the control circuit whereby said control circuit tends to adjust the signal from said potentiometer to a value producing a zero network signal.

7. A condition sensing system comprising a first electromechanical translator, means selectively to actuate said translator mechanically as a function of the condition to be sensed in a first and a second direction, an output for said translator for issuing a first signal in response to actuation in the first direction and a second signal in phase opposition to said first signal in response to actuation in the second direction, each of said first and second signals issuing as a function of the degree of actuation, a second electromechanical translator, an excitation circuit for said second translator, means to adjust the output signal issuing from said second translator, means to combine said output signals of said first and second translators, and means selectively to connect said excitation circuit to develop an output signal from said second translator in opposition to said first or second signals issuing from said first translator.

8. A condition sensing system comprising a first electromechanical translator, means selectively to actuate said translator mechanically as a function of the condition to be sensed in a first and a second direction, an output for said translator for issuing a first signal in response to actuation in the first direction and a second signal of a phase opposite that of said first signal in response to actuation in the second direction, each of said first and second signals issuing as a function of the degree of actuation, a second electromechanical translator, an excitation circuit for said second translator, means to adjust the output signal issuing from said second translator, means to combine said output signals of said first and second translators, means selectively to connect said excitation circuit to develop an output signal from said second translator in opposition to said first or second signals issuing from said first translator, a servomotor mechanically driving said adjusting means, a servomotor control responsive to the net signal of said opposed output signals, and means to shift the effective phase of said servomotor control simultaneously with the operation of said excitation circuit connecting means.

References Cited in the file of this patent

UNITED STATES PATENTS

| | | |
|---|---|---|
| 2,346,838 | Haight | Apr. 19, 1944 |
| 2,436,317 | Manjoine | Feb. 17, 1948 |
| 2,555,355 | MacGeorge | June 5, 1951 |
| 2,555,853 | Irwin | June 5, 1951 |
| 2,593,493 | Schlachman et al. | Apr. 22, 1952 |
| 2,633,484 | Zimmerman | Mar. 31, 1953 |
| 2,680,012 | Bozoian | June 1, 1954 |
| 2,766,981 | Lauler et al. | Oct. 16, 1956 |
| 2,805,311 | Fluegel et al. | Sept. 3, 1957 |